Nov. 30, 1948.  J. F. CARBONE ET AL  2,455,111
SELF-DEVELOPING CAMERA

Filed Oct. 17, 1947  4 Sheets-Sheet 1

INVENTORS
Joseph F. Carbone
and
BY Murry N. Fairbank

Donald L. Brown
Attorney

Nov. 30, 1948.    J. F. CARBONE ET AL    2,455,111
SELF-DEVELOPING CAMERA
Filed Oct. 17, 1947    4 Sheets-Sheet 2

INVENTORS
Joseph F. Carbone
and
BY Merry N. Fairbank
Donald R. Brown
Attorney

Nov. 30, 1948. J. F. CARBONE ET AL 2,455,111
SELF-DEVELOPING CAMERA
Filed Oct. 17, 1947 4 Sheets-Sheet 3

INVENTORS
Joseph J Carbone
and
BY Murry N. Fairbank

Donald L Brown
Attorney

Nov. 30, 1948.    J. F. CARBONE ET AL    2,455,111
SELF-DEVELOPING CAMERA

Filed Oct. 17, 1947    4 Sheets-Sheet 4

INVENTORS
Joseph F. Carbone
and
BY Murry H. Fairbank

Donald C. Brown
Attorney

Patented Nov. 30, 1948

2,455,111

UNITED STATES PATENT OFFICE 2,455,111

SELF-DEVELOPING CAMERA

Joseph F. Carbone, Everett, and Murry N. Fairbank, Belmont, Mass., assignors to Polaroid Corporation, Cambridge, Mass., a corporation of Delaware Application October 17, 1947, Serial No. 780,344

19 Claims. (Cl. 95—13)

This invention relates to photographic apparatus and more particularly to apparatus for exposing and processing a photographic film.

An object of the invention is to provide an apparatus for exposing a photographic film and for predeterminedly compressing the film with another sheet material to process exposed areas of said film.

Another object of the invention is to provide apparatus of the above type wherein a plurality of cooperating bodies for mounting the elements may be moved apart from one another to permit access to the interior of the apparatus for loading and threading the film and other sheet material.

A further object of the invention is to provide, in apparatus for treating a photographic film in the manner described, a plurality of light-tight chambers one of which is formed to receive the compressed materials and to hold the materials in a predetermined manner.

Still another object of the invention is to provide apparatus of the character described wherein a roll of film and a roll of another sheet material may be mounted separately and the materials may be advanced to superimposed relation and compressed while being advanced.

A still further object of the invention is to provide apparatus of the aforesaid type incorporated in a hand-held camera.

Further objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
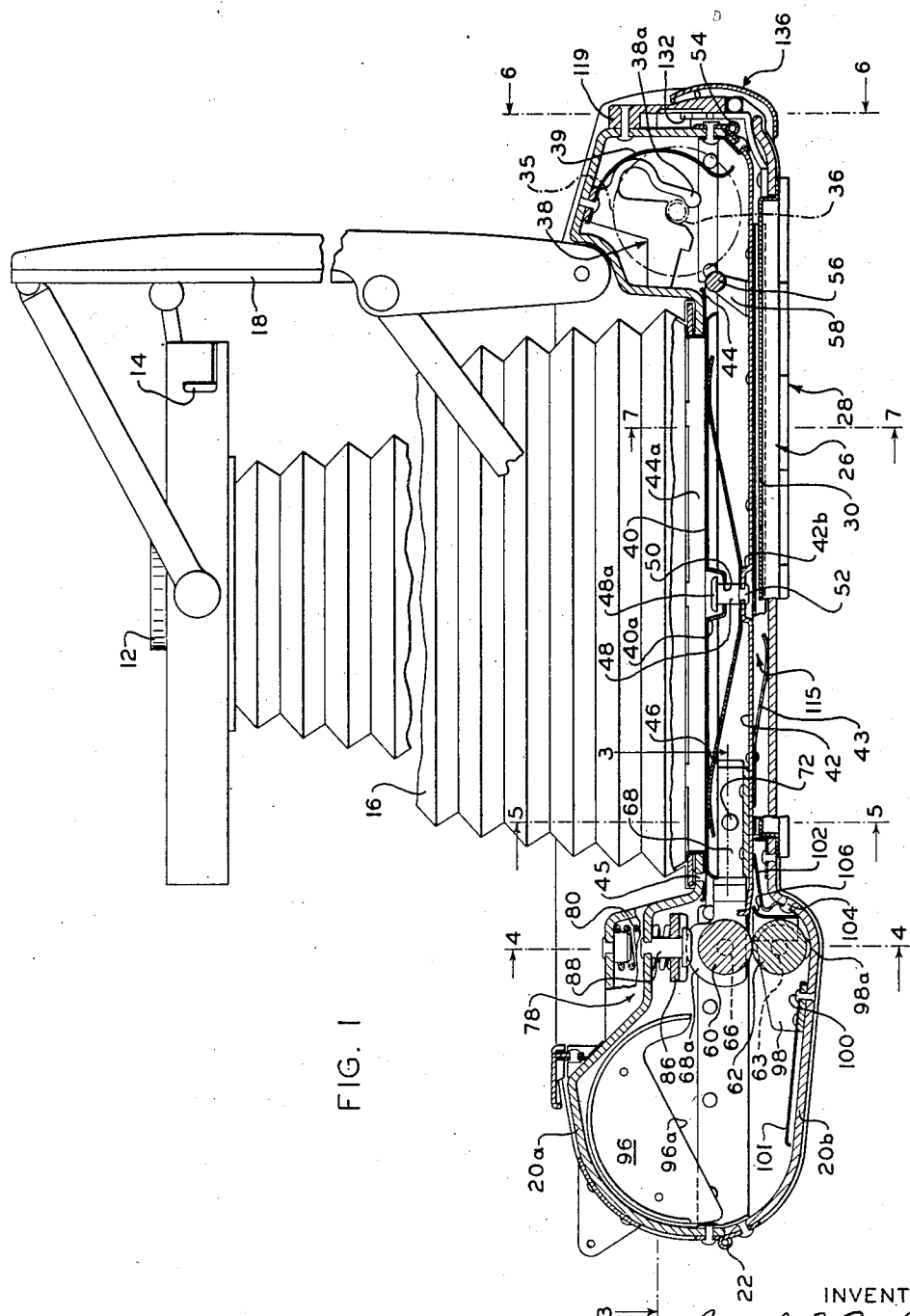
Figure 1 is a view of the apparatus partly in section and with parts broken away.

Photographic apparatus of the invention is adapted to perform a plurality of operations upon materials comprising a roll of photographic film, a roll of another sheet material such as a paper material of a width preferably similar to that of the film, and a plurality of collapsible fluid-bearing containers preferably mounted upon a surface of the paper material in predetermined spaced relation to one another. Each fluid container carries a supply of film-processing fluid adapted to be released therefrom and spread over an exposed area of film when successive portions of the film and paper material, including portions having the fluid containers positioned therebetween, are subjected to compression during movement of the materials between a pair of compressing elements, said movement being achieved, for example, by manually pulling the materials through a slot in the casing. The aforesaid materials and fluid containers are assembled in a predetermined relation to one another as, for example, leaders of the respective materials may be supplied fastened together or subsequently may thus be attached, or they may have an index for establishing their correct relative face-to-face position when mounted in the apparatus. Correct relative position of the materials, initially established, automatically brings each fluid container in contact with a portion of the film immediately in advance of an exposed area, during movement of the materials through the apparatus.

One of the aforesaid materials, and preferably the paper, may have a strip of predetermined thickness and composition as, for example, a thin strip of cellulosic material mounted upon and extending along both margins of a surface thereof, said surface preferably facing the film, it being understood that said strips are so mounted as to be positioned to one side of the picture area when the film and paper are superimposed. The strips are provided as spacers, operative while the materials are being compressed, to effect a predetermined minimum spacing between said materials for occupancy by said processing fluid which is forced therebetween. Compression of the materials during their advancement is effected by a pair of members at least one of which is biased toward the other to a degree whereby said member preferably yields only to variations in the thickness of the sheet materials and not to a divergent force such as may be due to hydraulic pressure of the fluid during the process of spreading said fluid.

In carrying out the above-described operations the apparatus is particularly adapted to perform a process whereby there is provided a positive photographic print upon or within one of the materials as, for example, upon the aforementioned paper material. In such a process, a preferred film comprises a silver halide emulsion as its photosensitive layer and a preferred processing fluid includes a viscous, aqueous, alkaline solution of a developer and a silver halide solvent. When a photographically exposed film and a paper material are positioned closely adjacent one another and a given quantity of film-processing fluid of the aforesaid type has been spread between and is simultaneously in contact with facing surfaces of both materials, the fluid enables formation of the paper of a positive image of the subject matter of a latent negative image within the exposed photosensitive layer of the film. The processing fluid may, however, include only a solvent for the reactive substances or the paper material may be adapted only to developing or to developing and fixing a latent negative image in a silver halide photosensitive layer. It is also possible to accomplish a predetermined processing of other photosensitive materials such as diazonium compounds, bichromates, or ferric salts through apparatus of the invention. Various suitable materials for the above-mentioned preferred and other processes are described in the copending application of Edwin H. Land, Serial No. 729,578, filed February 19, 1947, for Photographic process and apparatus.

The term "camera" as used herein is defined as a closed box or similar chamber having an aperture through which the image of an object is recorded on a photosensitive material. The term is intended to include photographic apparatus having a lens which focuses the image on the light-sensitive material, and photographic apparatus wherein a lens is not employed to focus the image on said light-sensitive material, as, for example, in apparatus for making contact type prints.

Referring to Fig. 1, in which a portion of the casing has been removed for a more complete showing of the apparatus, elements for photographically exposing a light-sensitive film may be provided, namely, lens 12, shutter release 14, bellows 16, and front-erecting mechanism 18, it being understood that elements, not shown, may be included for varying focus, shutter speed, and diaphragm aperture. A casing is provided, said casing being adapted to the special requirements of the apparatus, as will presently be described. The casing includes a frontal portion 20a, and a rear portion 20b preferably pivotally mounted at one extremity upon said frontal portion by a hinge 22 and releasably secured at the other end by a latch 24 which is shown in greater detail in Fig. 6. Casing portion 20b comprises a door 26 secured to said portion 20b as, for example, by hinge 28 and a latch (not shown), the function of said door being that of providing access to materials within the camera after their treatment for removal of each portion bearing a photographic image. Door 26 comprises an inner planar portion 30, the funtcion of which will presently be described. Pivotal casing portion 20b, bearing elements of the apparatus, is termed the rear supporting means or rear body 31 in contradistinction to other supporting means of the apparatus such as frontal portions within casing portion 20a and intermediate pivotal supporting means 32, presently to be described. The supporting bodies 31 and 32 are shown diagrammatically at partially opened positions in Fig. 2.

A roll of photosensitive film material 34 (Fig. 2) is supplied in convenient form for release as from a spool 35. An axial protuberance 36 of the spool is rotatably mounted at each end in an adapter 38 (Fig. 1) which is rigidly attached to the casing and comprises a spring clip 38a bearing upon protuberance 36 and providing a means for releasably mounting the spool. A retainer spring 39 bears upon the back of the film.

Intermediate supporting means 32 is held at closed position by said outer assembly 31 (Fig. 2) when the latter is closed and latched. Intermediate supporting means 32 comprises a pair of oppositely-facing planar surfaces one of which is adapted to position and support the film for exposure and the other of which is adapted to position and support areas of said film and another material in a predetermined manner after they have been compressed together. The aforesaid planar surfaces of means 32 are provided, respectively, by a pressure plate 40 and a planar plate member 42. A pair of spring members 43 (one spring being shown) are mounted upon plate member 42 adjacent its edges in such manner that casing 20b of outer pivotal supporting means 31 engages said springs when the pivotal assemblies are at closed position, springs 43 serving to hold intermediate supporting means 32 firmly at said position and to provide a shock-absorbing means therefor. A framing plate 44 rigidly fastened to frontal casing portion 20a as by rivets 45 is adapted to cooperate with pressure plate 40 for positioning and holding an area of film 34a (Fig. 2) for subjection to photographic exposure. The framing plate 44 may preferably comprise outwardly extending portions 44a which are utilized for attaching bellows 16 thereto. Pressure plate 40 is biased toward framing plate 44 by a compression spring 46. Mounting means for pressure plate 40, which permit its bodily movement toward and away from framing plate 44, comprise a pair of transversely spaced, smooth-surfaced studs 48 (one of the studs only being shown), each of said studs being adapted, respectively, to be passed freely through a perforation 50 formed in pressure plate 40 and to be rigidly attached to fixed plate member 42, as by a screw 52 threaded within each stud. Planar supporting plate 42 comprises side portions 42a (Fig. 5) extending longitudinally thereof, said side portions being formed, for example, of marginal areas of the plate which have been turned inwardly at right angles to the main surface of said plate. Plate member 42 is pivotally attached to frontal casing 20a by a hingle 54 and thus provides the pivotal mounting for intermediate supporting means 32, of which said plate member 42 constitutes an element. Supporting means 31 and 32, thus pivotally mounted, provide novel means for readily loading and threading materials of the type employed. Each of said screws 52 is passed through an individual perforation formed in a transversely extending mid-portion of spring 46 and serves as a means for fixedly mounting said spring relative to plate member 42. It will be observed that pressure plate 40 and plate member 42 are provided, respectively, with counter-sunk or recessed portions 40a and 42b within which studs 48 and screws 52 are positioned so as not to protrude beyond the planar surfaces of said members and preferably so as to be spaced from the planes of said surfaces. Stud 48 comprises a head 48a which serves to limit movement of pressure plate 40 toward and away from planar plate member 42. A guide roller 56 mounted upon an arm 58 rigidly attached to plate member 42 serves, when assembly 32 is closed, to maintain a constant angle of approach of film 34 toward an exposure plane established between pressure plate 40 and framing plate 44, irrespective of the diameter of the roll of film mounted on spool 35 which changes as said film is unwound from the spool.

Figure 2:
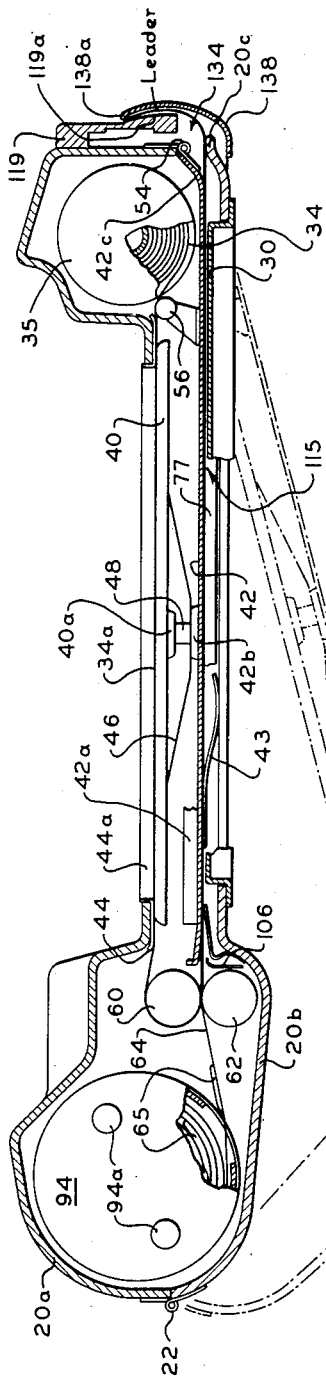
Fig. 2 is a diagrammatic view of elements of Fig. 1 showing a film material and another material mounted and threaded therein.
Figure 5:
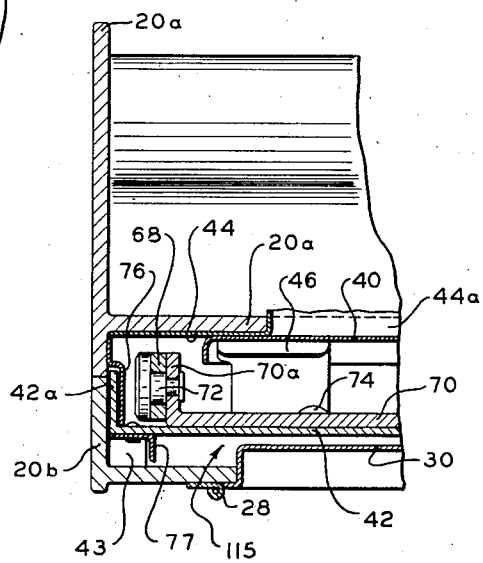
Fig. 5 is a sectional view of a fragmentary portion of the apparatus on the line 5—5 of Fig. 1.
Figure 7:
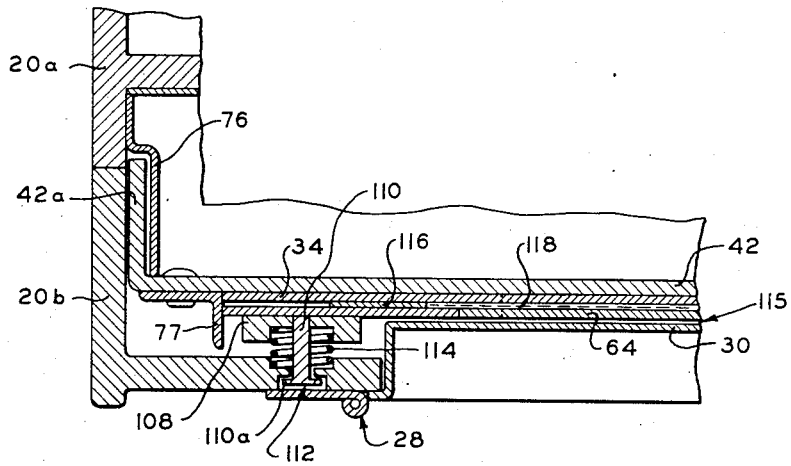
Fig. 7 is a sectional view of a fragmentary portion of the apparatus on the line 7—7 of Fig. 1 including a section of film materials positioned therewithin.

A pair of pressure-applying members, such as rollers 60 and 62, are mounted adjacent an end of framing plate 44 and of pressure plate 40 from which film area 34a is withdrawn from the aforesaid exposure plane after its exposure. Said rollers may preferably be rotatably mounted and formed of a substantially nonyielding material as, for example, of a metal such as stainless steel. The rollers are adapted to have film 34 and another sheet material 64 having fluid containers 65 mounted thereon advanced between their surfaces in face-to-face relation and to compress successive portions of the materials during their advancement as shown in Fig. 2. A preferred positioning of plate member 42 relative to rollers 60 and 62 provides that the compressed materials pass from the rollers in a plane which is at 90° to a plane passing through the axes of said rollers. It will be apparent that said relative arrangement of elements avoids bending or further compressing materials having a layer of fluid therebetween. At least one of the rollers is preferably spring urged toward the other, roller 60 being selected for the purpose and comprising a shaft 66 which is journaled at each extremity in one of a pair of arms 68, each arm, in turn, being pivotally mounted upon an extending member 70a of a yoke-like bracket 70 by a pivot 72 as shown clearly in Figs. 3 and 5. The base of bracket 70 is rigidly attached to fixed plate member 42, rivets 74 being provided for the purpose and a limit of pivotal movement of each arm 68 is provided by contact of said arm with said plate member 42. Bracket 70 is positioned between and spaced from side portions 42a of fixed supporting plate member 42. As shown in Figs. 5 and 7, each of said side portions 42a serves a dual function in conjunction with a cooperating angled strip 76 which is rigidly attached to and extends both inwardly from and parallel to fixed casing 20a. When intermediate supporting means 32 is pivoted to closed position, said position being shown in Fig. 1, side portions 42a are thereby slidably inserted in a recess formed between strips 76 and casing portions 20a and 20b, said side portions, strips, and casing portions cooperating to form a light-shield which prevents light from passing at any point around the sides of intermediate supporting body 32 to the exposure plane or to the supply of light-sensitive film when, for example, door 26 is opened, it being uderstood that both strips 76 and side portions 42a are substantially coextensive in length. The point of contact of the tip of strips 76 and plate member 42 establishes the closed position of intermediate supporting means 32, said strips 76 and plate member 42 thus cooperating to provide a limit stop. Figs. 2, 5 and 7 also show one of a pair of guide members 77 adapted to engage longitudinal edges of the materials and thus to prevent the materials from slipping sideways while being advanced.

Figure 3:
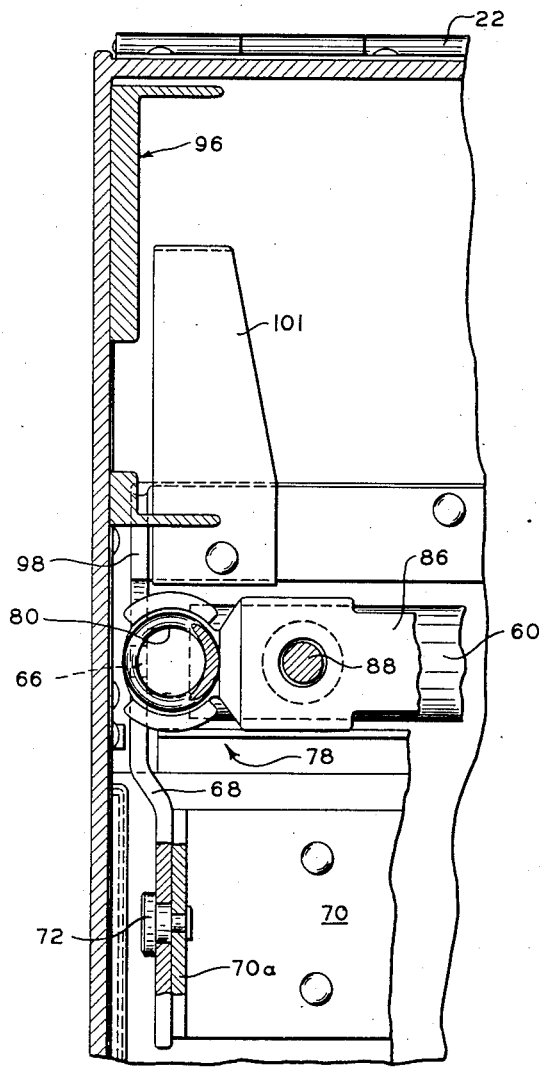
Fig. 3 is a plan view of a fragmentary portion of the apparatus on the line 3—3 of Fig. 1.
Figure 4:
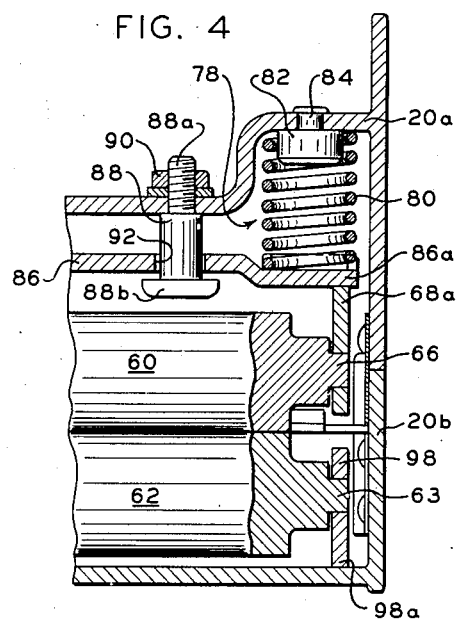
Fig. 4 is a sectional view of a fragmentary portion of the apparatus on the line 4—4 of Fig. 1.

Each pivotal arm 68 which serves to mount roller 60 includes an enlarged portion 68a adapted to engage an element of a bias-applying means 78 (Figs. 1, 3 and 4). Bias-applying means 78 urges roller 60 toward roller 62 when said rollers are at operational positions. The construction embodying a pair of individual pivotable arms 68, having no rigid structural connection therebetween, and of a separate bias-applying means 78 in association with each arm, provides a mounting for the compressing means permitting said means to self-adjust to any variations in thickness of the materials to be compressed which may be present between one transverse edge and the other. Said compressing means are thus adapted to readily follow surface contour of the materials during the compressing process and to effect an evenness of compression. Accordingly, individually pivotable arms 68, while enabling arcual movement of roller 60 around pivot 72, also permit pivotal movement of said roller 60 in a given plane about any of a plurality of pivot points lying along the axis of said roller. Said last-named pivot points at any particular time will be determined by the nature of the variation in the materials encountered by roller 60 which may cause a slight sideways tilt thereof. While individually pivotable arms 68 are shown and the desirable features thereof have been pointed out, said arms may, however, be connected as in the form of a yoke, said yoke providing a satisfactory alternate type of mounting for roller 60, at least where transverse variations in the materials are small.

As clearly shown in Fig. 4, bias-applying means 78 comprises a compression spring 80 seated at one end in a portion of casing 20a, a spring locator 82 rigidly attached to casing 20a by a pin 84, a plate member 86 having a portion 86a adapted to seat the opposite end of spring 80, and to bear upon said flared portion 68a of arm 68 for transmitting biasing pressure thereto, and a smooth-surfaced stud 88 attached to casing 20a as by threaded portion 88a and nut 90, said stud being adapted to be inserted in a perforation 92 in plate 86 and to permit said plate 86 to be slidably moved relative thereto. Stud 88 also comprises a head 88b which serves as a limit stop against which plate 86 is brought to bear when intermediate supporting means 32 is swung to open position, carrying arms 68 and pressure roller 60 away from biasing means 78, plate 86 and spring 80 thus being held against release from casing 20a. The fragmentary portions of apparatus shown in Figs. 3 and 4 illustrate mounting means for pressure rollers 60 and 62, and biasing means 78 for said roller 60 which, it will be understood, are duplicated at opposite extremities of said rollers 60 and 62. Plate member 86 preferably comprises a single member the extremities of which bear upon portion 68a of each pivotal arm 68.

As shown in Fig. 2 sheet material 64 is preferably supplied in a form such that said material may be rolled loosely within a cartridge 94, the cartridge having associated means for assuring its proper position in the apparatus such as a pair of keying lugs 94a extending from each end thereof. Sheet material 64 is shown having a plurality of collapsible fluid containers 65 mounted thereon, said containers being adapted to collapse when subjected to a predetermined compression. It will be understood that mounting means for a supply of material bearing fluid containers of the character described preferably avoids any appreciable compression of said containers which might cause their premature collapse. Cartridge 94 is adapted to be inserted in a cartridge holder 96 (Fig. 1) comprising edge portions 96a against which said lugs 94a are placed in contact for establishing the position of said cartridge within said cartridge holder such, for example, that a slot in the cartridge is positioned substantially facing the gripping area of pressure rollers 60 and 62 for feeding material 64 thereto. In a modification of the cartridge and holder, a circular chamber having a slot similar to that of cartridge 94, above described, and access means thereto for loading a roll of sheet material 64 may be employed for mounting a supply of said material 64.

Roller 62 comprises shaft 63 journaled in a pair of brackets 98 (one bracket only being shown in Figs. 1 and 4), said brackets, in turn, being fixedly mounted upon casing portion 20b, as by rivets 100. An ear 98a extending from each bracket and engaging casing 20b provides additional rigidity to the bracket. It will be observed that roller 62, mounted upon rear supporting means 31, is adapted to be pivoted outwardly therewith for mounting the rolls of film 34 and other sheet material 64 and for threading said materials between the rollers, as clearly shown in Fig. 2.

Several other elements now to be described are associated with rear supporting means 31. A pair of flat spring members 101 (one member only being shown) are attached to casing 20b by aforesaid rivets 100, said spring members being adapted to hold cartridge 94 (Fig. 2) in cartridge holder 96 (Fig. 1). Light-shielding spring member 102, which may be formed, for example, of a thin strip of suitably elastic metal, extends transversely across and beyond the edges of sheet material 64 upon which it is adapted to bear lightly. Said spring strip is attached to casing 20b as by a plurality of rivets 104 spaced transversely thereof (one rivet being shown). Spring member 102 is narrowly spaced from the sides of casing 20b so that said spring may move in response to any variations in thickness of the materials, without interferences from the sides of the casing. A light-shielding baffle 106 is mounted upon each of the sides of casing 20b from which spring member 102 is narrowly spaced to provide a further obstruction in the uncovered spaces left by member 102, said spring member 102 and said baffle 106 thus coacting to prevent light from passing to and around the extremities of rollers 60 and 62 when door 26 is opened.

Means may be provided for holding longitudinal marginal portions of the materials against displacement while a portion of sheet material 64 as, for example, a portion bearing a positive image is removed from remaining portions of said material, said portion being defined, for example, by perforations enabling its ready removal and door 26 being provided for access to said portion. One of a pair of means suitable for holding said marginal portions of the materials is shown in detail in Fig. 7 and comprises a bar 108, a stud 110 rigidly attached to said bar, said stud being adapted to be slidably mounted in a perforation 112 formed in casing 20b and to be retained in said perforation by a head 110a, and a compression spring 114 for biasing said bar 108 toward the superimposed materials 64 and 34, it being understood that a plurality of said studs 110 and springs 114 are positioned in spaced relation along each bar 108. It is to be assumed that bias applied by spring 114 is insufficient to prevent slidable movement of the materials with respect to bars 108 although it will be readily apparent that additional means for selectively placing said bars in or out of contact with sheet 64 could be employed, in which instance the force exerted by springs 114 when the bar is in contact with the materials could be in excess of that above described.

The cross-sectional view of materials shown in Fig. 7 represents film material 34 and sheet material 64 after they have been subjected to compressing members 60 and 62, said materials lying within a chamber 115 which is rendered free from actinic light and wherein said materials may be held for completion of the image-forming process. Spacer strips 116 have performed their function of predeterminedly spacing said compressing members 60 and 62, and processing fluid 118 has been spread between the materials as a layer of predetermined thickness. Also shown clearly in Fig. 7 is an adjacent relationship of plate 30 to sheet material 64 for maintaining the materials in a substantially flattened condition after the fluid has been spread therebetween, and the function served by guide members 77 of preventing sideways movement of the materials or, otherwise stated, of maintaining said movement in a given direction.

Figure 6:
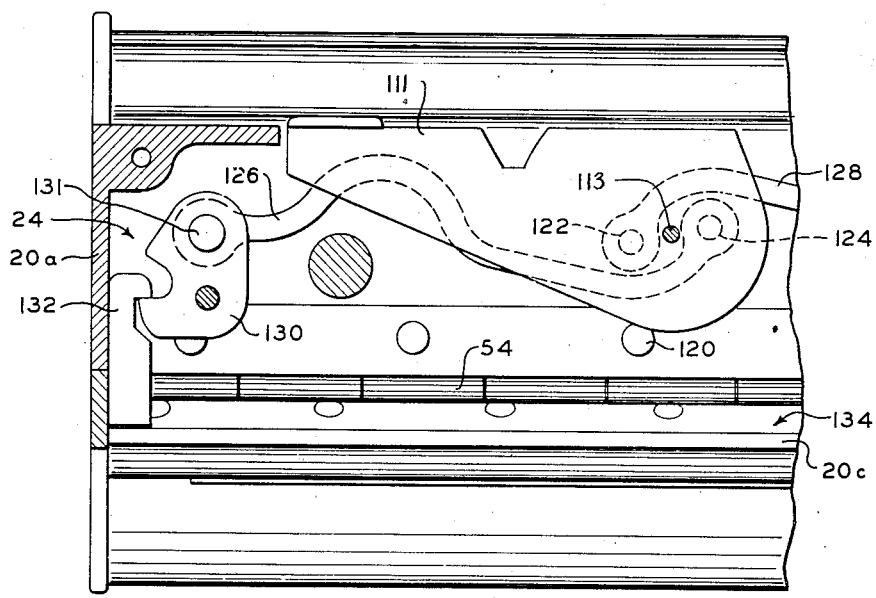
Fig. 6 is a sectional view of a fragmentary portion of the apparatus on the line 6—6 of Fig. 1.

A suitable form of latch for holding rear supporting means 31 at closed position is represented by the toggle latch 24 illustrated in Fig. 6. Latch 24 comprises latch lever 111 mounted for rotation upon a shaft 113 which, in turn, is mounted upon a transverse plate member 119, the latter being rigidly attached to casing 20a as by rivets 120. A pair of crank pins 122 and 124 are mounted upon said latch lever 111 in spaced relation around shaft 113 so as to be positioned radially opposite one another. A pair of arms 126 and 128 are pivotally connected at an extremity of each to said crank pins 122 and 124 and are so shaped that rotation of the disc provides substantially lateral movement of said arms. Arms 126 and 128 are pivotally connected at their opposite extremities to pivotal male latch members 130 by pivots 131, said lateral movement of the arms providing pivotal movement of said members 130. Pivotal members 130 are capable of engaging and disengaging female latch members 132 (one each of said members 130 and 132 and one pivot 131 only being shown) in response to actuation of latch lever 111, said members 132 being fixedly mounted upon pivotal casing 20b.

As shown in Figs. 2 and 6, a slot 134 is formed between an edge of casing 20b and an edge of transverse plate member 119 at closed position of the former, said slot being positioned slightly to one side of the plane in which the materials lie when the latter are positioned in chamber 115 against plate member 42, said slot 134 coacting with a curved portion 20c of casing 20b and a curved portion 42c of plate member 42 so that any actinic light entering said slot is prevented from following a straight path to the materials. Plate 119 is provided with a convex external surface 119a adjacent slot 134. A yoke-like element 136, the transverse connecting member 138 of which is formed to provide a concave surface, is pivotally mounted upon casing 20b. When element 136 is pivoted to bring the concave surface of member 138 adjacent convex surface 119a, a leader (Fig. 2) of the compressed materials, which remains extending through slot 134 after threading of the materials, is caused to be bent around plate surface 119a by said member 138 and to assume a position between said convex and concave surfaces where it is firmly held thereby. The center point around which the arcual surface of member 138 is described is preferably eccentric with respect to the center point of the arcual surface of plate 119. An advanced portion of said materials may then be drawn taut and severed against the extremity 138a of member 138 and after said portion of materials has been thus torn and member 136 is pivoted away from surface 119a, a short leader of the materials remains in the form of a tab which may be utilized for drawing succeeding lengths of the materials through the apparatus. Member 138 also serves as a closure for slot 134 when yoke 136 is pivoted to bring said element 138 adjacent thereto.

A brief summary of operation of the apparatus follows. During loading of the materials, the apparatus is preferably held face down or may be placed face down on a flat surface. Latch 24 is released by latch lever 111 and rear and intermediate pivotal supporting bodies 31 and 32, respectively, are pivoted to open position. Extremities of a leader of the film 34 and a leader of the other material 64 are held together in register in one hand adjacent cartridge holder 96. With the other hand, spool 35 holding the film is inserted in adapter 38 and cartridge 94 holding sheet material 64 is inserted in holder 96, said procedure automatically placing a length of the leader of film across framing plate 44. Intermediate pivotal supporting means 32 is then closed and the joined extremities of the leaders are pulled across plate 42 to a position slightly beyond the end of the camera. Rear pivotal supporting means 31 is closed and latched and the leaders, protruding through slot 134 and held together in predetermined register, are drawn from the camera until the poistioning of a light-sensitive area of the film in the exposure plane is indicated, as by the positioning of a mark, inscribed on the back of sheet material 64, at the edge of slot 134 or, for example, by a predetermined resistance to pulling of the materials when leading portions of a fluid container are caused to engage rollers 60 and 62. Pivotal yoke member 136 is closed and any excess of the leaders is torn off against the tip of element 138 leaving a short tab. Said area of film may then be exposed. After exposure of film area 34a, yoke member 136 is opened, the tab of materials is grasped and additional leader materials are withdrawn through slot 134 until a second mark is positioned adjacent slot 134 when yoke member 136 is again closed. The last-named withdrawal of leader materials provides movement of the exposed area of film 34a and a similar area of material 64 in face-to-face relation between compressing members 60 and 62, fluid container 65 passing between said members 60 and 62 immediately in advance of said exposed area 34a. When the materials are thus advanced between compressing members 60 and 62, the film-processing fluid is released from container 65 and is caused to flow between the materials and to cover facing areas thereof, whereby the exposed area of film may be permeated by the fluid and processed and a positive image may be formed on one of said materials as, for example, material 64, as hereinbefore described. After a predetermined period, door 26 may be opened and a portion of material 64 bearing said positive image may be removed, said portion having been perforated during manufacture for the purpose, it being understood that longitudinal marginal portions of material 64 are preferably not included in said removal and provide connecting strips of material 64. Door 26 is closed and the apparatus is then ready for a second exposure of film and for a second sequence of operations similar to those described above for processing an exposed area thereof.

Certain modifications of an obvious nature may be made in the apparatus. The roll of film may be mounted upon intermediate pivotal means 32 for more ready access thereto. The hinge 22 which is employed to pivotally mount rear supporting body 31 may be supplanted by other means for releasably holding the end of said body, whereat said hinge is shown. Said holding means could, for example, be in the form of hooked members engaging a bar when latch 24 is closed or in the form of an additional latch similar to latch 24. Provided that certain further light-shielding means are employed, pivotal rear supporting means 31 per se or the modified latched means substituted therefor could be employed in place of door 26 for removing portions of the materials bearing the image. It will also be obvious that door 26 could be in the form of a slidable panel or removable plate. If door 26 is eliminated as above suggested, member 31 would serve the function of said door as well as other functions previously described. Use of a pair of thin strips of material extending along marginal portions of the film or other sheet material has been described as a means for spreading a layer of fluid of predetermined thickness between the materials. Alternatively, means may be incorporated with the apparatus to achieve a substantially comparable result as, for example, either or both of the pressure rollers may comprise flanges adjacent their extremities which are adapted to bear upon the materials, the total thickness of said flanges approximating the thickness of said spacer strips. Provided exposure of a second area of film is made rapidly after advancement of a preceding exposed area thereof to chamber 115 or provided that an area of film material not employed for image-forming purposes is positioned in the exposure plane when a preceding exposed area thereof is positioned in said exposure chamber 115, it would be possible to withdraw the materials directly from the casing after the film has been processed. The materials could be so withdrawn before completion of their processing provided the film base and the other sheet material are opaque. Wherein guide means have been shown to control the direction of movement of the materials and more particularly to prevent transverse displacement of one material with respect to the other during their movement between the pressure-applying members, fixed guides for contacting edges of the materials during their movement around and between said members would provide an effective means for the purpose. Further edge guides adjacent slot 134 would serve to cooperate with said fixed guides for providing a greater measure of control. Provided it is desired to include stop means for automatically halting movement of each exposed area of film after processing thereof, a form of limit stop means such as that involving the entrance of a pin into predeterminedly spaced perforations in the materials could be employed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for exposing and processing a photosensitive film material comprising, in combination, means for mounting a film material and another sheet material, means providing an exposure position for said film material, means comprising a pair of pressure-applying members between which said materials are to be advanced in superposed relation for compressing said materials during their advancement and for cooperating therewith to provide flow of a film-processing fluid between said materials, means engaging at least one of said materials for preventing transverse displacement of said material with respect to said other material during advancement of the materials between the pressure-applying members, and a plurality of means movably mounted with respect to one another for supporting and at least partially encasing the aforesaid means, one of said supporting means serving to mount one of said pressure-applying members and another of said supporting means mounting the other of said pressure-applying members, said movable supporting means when at open position providing a separation of said pressure-applying members from one another and access within said apparatus for loading and threading said film and other material and when at closed position providing a light-tight chamber for said apparatus and placement of said pressure-applying members in adjacent relation to one another for compressing said materials.

2. Apparatus for exposing and processing a photosensitive film material comprising, in combination, means for mounting a film material, means for mounting another sheet material, means providing an exposure position for said film material, means comprising a pair of pressure-applying members between which said materials are to be advanced in superposed relation for compressing said materials during their advancement and for cooperating therewith to provide flow of a film-processing fluid between said materials, and means comprising a plurality of relatively movable bodies for supporting the aforesaid means, a pair of said bodies providing front and rear casing portions of said apparatus and a third body intermediate of said pair of bodies forming therewith a plurality of chambers comprising an exposure chamber for said film material and another chamber for holding said materials free from actinic light after their subjection to compression, said other chamber being located to receive said film material as it advances from the exposure chamber and said pressure-applying members being so located relative to said chambers as to compress said materials as said film material advances from said exposure chamber into said other chamber.

3. Apparatus for exposing and processing a photosensitive film material comprising, in combination, means for mounting a film material, means for mounting another sheet material, means providing an exposure position for said film material, means comprising a pair of pressure-applying members between which said materials are to be advanced in superposed relation for compressing said materials during their advancement and for cooperating therewith to provide flow of a film-processing fluid between said materials, and means comprising a plurality of relatively movable bodies for supporting the aforesaid means, a pair of said bodies providing front and rear casing portions of said apparatus and a third body intermediate of said pair of bodies forming therewith a plurality of chambers comprising an exposure chamber for said film material and another chamber for holding said materials free from actinic light after their subjection to compression, one of said supporting bodies serving to mount one of said pressure-applying members and another of said supporting bodies mounting the other of said pressure-applying members, said movable supporting bodies, at open position, providing a separation of said pressure-applying members from one another and access to said chambers for loading and threading said materials and, at closed position, providing formation of said chambers and placement of said pressure-applying members in adjacent relation to one another for treating said materials.

4. Apparatus for exposing and processing a photosensitive film material comprising, in combination, means for mounting a roll of film material, means for mounting a roll of another sheet material, means positioned between said mounting means for the film and other material providing an exposure position for said film material, means comprising a pair of pressure-applying members between which said materials are to be advanced in superposed relation for compressing said materials during their advancement and for cooperating therewith to provide flow of a film-processing fluid between said materials, and means comprising a plurality of relatively pivotable bodies for supporting the aforesaid means, a pair of said bodies providing front and rear casing portions of said apparatus and a third body intermediate of said pair of bodies forming therewith an exposure chamber for said film material and another chamber for holding said materials free from actinic light after their subjection to compression, one of said supporting bodies serving to mount one of said pressure-applying members and another of said supporting bodies mounting the other of said pressure-applying members, said pivotable supporting bodies, at open position, providing a separation of said pressure-applying members from one another and access to said chambers for loading and threading said materials and, at closed position, providing formation of said chambers and placement of said pressure-applying members in adjacent relation to one another for treating said materials.

5. Apparatus for exposing and processing a photosensitive film material comprising, in combination, means for mounting a roll of film material, means for mounting a roll of another sheet material, means positioned between said mounting means for the film and other material providing an exposure position for said film material, means comprising a pair of pressure-applying members between which said materials are to be advanced in superposed relation for compressing said materials during their advancement and for cooperating therewith to provide flow of a film-processing fluid between said materials, and means comprising a plurality of relatively pivotable bodies for supporting the aforesaid means, a pair of said bodies providing front and rear casing portions of said apparatus and a third body intermediate of said pair of bodies forming therewith an exposure chamber for said film material and another chamber for holding said materials free from actinic light after their subjection to compression, said other chamber being located to receive said film material as it advances from the exposure chamber and said pressure-applying members being so located relative to said chambers as to compress said materials as said film material advances from said exposure chamber into said other chamber.

6. Apparatus for exposing and processing a photosensitive film material comprising, in combination, means for mounting a roll of film material, means for mounting a roll of another sheet material, means positioned between said mounting means for the film and other material providing an exposure position for said film material, means comprising a pair of pressure-applying members between which said materials are to be advanced in superposed relation for compressing said materials during their advancement and for cooperating therewith to provide flow of a film-processing fluid between said materials, guide means engaging at least one of said materials for preventing transverse displacement of said material with respect to said other material during advancement of the materials between the pressure-applying members, means comprising a plurality of relatively pivotable bodies for supporting the aforesaid means, a pair of said bodies providing front and rear casing portions of said apparatus and a third body intermediate of said pair of bodies forming therewith an exposure chamber for said film material and another chamber for holding said materials free from actinic light and in a flattened condition after their subjection to compression, the rearmost of said supporting bodies serving to mount one of said pressure-applying members and said intermediate supporting body mounting the other of said pressure-applying members, said pivotable supporting bodies, at open position, providing a separation of said pressure-applying members from one another and access to said chambers for loading and threading said materials and, at closed position, providing formation of said chambers and placement of said pressure-applying members in adjacent relation to one another for treating said materials, and means forming a slot in a portion of said second-named chamber spaced from said pressure-applying members by a length exceeding the distance of said film material capable of being exposed when in said exposure position for manually drawing said materials through said apparatus to a position exteriorly thereof.

7. Apparatus for exposing and processing a photosensitive film material comprising, in combination, means for mounting a roll of film material, means for mounting a roll of another sheet material, means comprising a pair of pressure rollers between which said materials are to be advanced in superposed relation for compressing said materials during their advancement and for cooperating therewith to provide flow of a film-processing fluid between said materials, means comprising a plurality of relatively pivotable bodies for supporting the aforesaid means, a pair of said bodies providing front and rear casing portions of said apparatus and a third body intermediate of said pair of bodies comprising a spring-urged pressure plate forming with one of said pair of bodies an exposure chamber for said film material and comprising a rigid plate forming with the other of said pair of bodies another chamber for holding said materials free from actinic light after their subjection to compression, the rearmost of said supporting bodies serving to mount one of said pressure rollers and said intermediate supporting body mounting the other end of said pressure rollers, said pivotable supporting bodies, at open position, providing a separation of said pressure rollers from one another and access to said chambers for loading and threading said materials and, at closed position, providing formation of said chambers and placement of said pressure rollers in adjacent relation to one another for treating said materials, and means forming a slot at an extremity of said second-named chamber remote from said pressure rollers for manually drawing said materials through said apparatus, said slot having associated means for preventing the entrance of actinic light therethrough.

8. Apparatus for exposing and processing a photosensitive film material comprising, in combination, means for mounting a roll of film material, means for mounting a roll of another sheet material, means comprising a pair of pressure rollers between which said materials are to be advanced in superposed relation for compressing said materials during their advancement and for cooperating therewith to provide flow of a film-processing fluid between said materials, and means comprising a plurality of relatively pivotable bodies for supporting the aforesaid means, a pair of said bodies providing front and rear casing portions of said apparatus and a third body intermediate of said pair of bodies comprising a spring-urged pressure plate forming with one of said pair of bodies an exposure chamber for said film material and comprising a rigid plate forming with the other of said pair of bodies another chamber for holding said materials free from actinic light after their subjection to compression, the rearmost of said supporting bodies serving to mount one of said pressure rollers and said intermediate supporting body mounting the other of said pressure rollers, said pivotable supporting bodies, at open position, providing a separation of said pressure rollers from one another and access to said chambers for loading and threading said materials and, at closed position, providing formation of said chambers and placement of said pressure rollers in adjacent relation to one another for treating said materials.

9. Apparatus for exposing and processing a photosensitive film material comprising, in combination, means for mounting a film material, means for mounting another sheet material, means comprising a pair of pressure-applying members between which said materials are to be advanced in superposed relation for compressing said materials during their advancement and for cooperating therewith to provide flow of a film-processing fluid between said materials, guide means positioned for engaging the longitudinal edges of at least one of said materials for preventing transverse displacement of said material with respect to said other material during advancement of materials between the pressure-applying members, means comprising a plurality of relatively movable bodies for supporting the aforesaid means, said bodies including a frontal body comprising a casing portion having means for mounting said film and other material mounted therein and providing an exposure aperture for said film, an intermediate body carrying one of said pressure-applying members and comprising at least a portion of said guide means, a spring-urged pressure plate cooperating with said frontal body to provide an exposure chamber for the film and a ridged plate for supporting said materials after compression, and a rear body comprising another casing portion forming a second chamber in conjunction with the rigid plate of said intermediate body and mounting the other of said pressure-applying members, said movable supporting bodies, at open position, providing a separation of said pressure-applying members from one another and access to said chambers for loading and threading said materials and, at closed position, providing formation of said chambers and placement of said pressure-applying members in adjacent relation to one another for treating said materials, and means forming a slot between casing portions of said first- and second-named bodies positioned adjacent an extremity of the rigid plate of said intermediate body for manually drawing said materials through said apparatus to a position exteriorly thereof.

10. Apparatus for exposing and processing a photosensitive film material comprising, in combination, means for mounting a film material, means for mounting another sheet material, means comprising a pair of pressure-applying members for compressing said materials during their advancement and for cooperating therewith to provide flow of a film-processing fluid between said materials, means comprising a plurality of relatively pivotable bodies for supporting the aforesaid means, said bodies including a frontal body comprising a casing portion having means for mounting at least one of said film and other materials mounted therein and providing an exposure aperture for said film, an intermediate body comprising means yieldingly mounting one of said pressure-applying members, said intermediate body cooperating with said frontal body to form an exposure chamber, and a rear body comprising another casing portion forming in conjunction with said intermediate body a second chamber for holding the materials free from actinic light after their compression and for mounting the other of said pressure-applying members, said frontal body comprising spring-urged means for engaging said means yieldingly mounting said pressure-applying member to apply a bias thereto, said pivotable supporting bodies, at open position, providing a separation of said pressure-applying members from one another and access to said chambers for loading and threading said materials and, at closed position, providing formation of said chambers and placement of said pressure-applying members in adjacent relation to one another for treating said materials, and means forming a slot between casing portions of said first- and second-named bodies providing egress means for said materials from said second-named chamber so that said materials may be drawn through said apparatus to a position exteriorly thereof, said slot being so positioned relative to portions of said intermediate body that said portions prevent light from passing directly within said second-named chamber.

11. Apparatus for exposing and processing a photosensitive film material comprising, in combination, means for mounting a roll of said film material, means for mounting a roll of another sheet material, means positioned between said mounting means for the film and other material providing an exposure position for said film material, means for exposing said film material when in said exposure position, means comprising a pair of pressure-applying members between which said materials are to be advanced in superposed relation for compressing said materials during their advancement and for cooperating therewith to provide a flow of a film-processing fluid between said materials, and means comprising a plurality of pivotable bodies for supporting the aforesaid means, a frontal body and a rear body thereof providing separate casing portions of said apparatus and a third body, intermediate of said frontal and rear bodies, forming therewith both an exposure chamber for said film material and another chamber for shielding said materials from actinic light after their subjection to compression, said frontal body serving to mount said means for exposing said film, said intermediate body serving to mount one of said pressure-applying members and being pivotally connected to said frontal body at one end of the latter and said rear body serving to mount the other of said pressure-applying members and being pivotally connected to said frontal body at an opposite end of the latter, said pivotal bodies, when at open position, providing a separation of said pressure-applying members from one another and access within the apparatus for loading and threading said film and other material and, at closed position, providing formation of said chambers and placement of said pressure-applying members in adjacent relation to one another for treating said materials.

12. Apparatus for exposing and processing a photosensitive film material comprising, in combination, means for mounting a roll of said film material, means for mounting a roll of another sheet material, means positioned between said mounting means for the film and other material providing an exposure position for said film material, means for exposing said film material when in said exposure position, means comprising a pair of pressure-applying members between which said materials are to be advanced in superposed relation for compressing said materials during their advancement and for cooperating therewith to provide a flow of a film-processing fluid between said materials, means comprising a plurality of pivotable bodies for supporting the aforesaid means, a frontal body and a rear body thereof providing separate casing portions of said apparatus and a third body, intermediate of said frontal and rear bodies, comprising portions forming therewith both an exposure chamber for said film material and another chamber for shielding said materials from actinic light after their subjection to compression, said frontal body serving to mount said means for exposing said film, said intermediate body serving to mount one of said pressure-applying members and being pivotally connected to said frontal body at one end of the latter and said rear body serving to mount the other of said pressure-applying members and being pivotally connected to said frontal body at an opposite end of the latter, spring-urged means mounted upon said frontal body for applying a bias to said pressure-applying member mounted upon said intermediate body, means for releasably locking said rear body at closed position thereof, and means comprising a spring-like member mounted upon a surface of one of said intermediate and rear pivotable bodies which faces a surface of the other body when said bodies are pivoted to closed position, said spring serving to hold said intermediate body at closed position, the aforesaid pivotal bodies, when at open position, providing a separation of said pressure-applying members from one another and access within the apparatus for loading and threading said film and other material and, at closed position, providing formation of said chambers and placement of said pressure-applying members in adjacent relation to one another for treating said materials.

13. Apparatus for exposing and processing a photosensitive film material comprising, in combination, means for mounting a roll of said film material, means for mounting a roll of another sheet material, means positioned between said mounting means for the film and other material providing an exposure position for said film material, means for exposing said film material when in said exposure position, means comprising a pair of pressure-applying members between which said materials are to be advanced in superposed relation for compressing said materials during their advancement and for cooperating therewith to provide a flow of a film-processing fluid between said materials, and means comprising a plurality of pivotable bodies for supporting the aforesaid means, a frontal body and a rear body thereof providing separate casing portions of said apparatus and a third body, intermediate of said frontal and rear bodies, comprising portions forming therewith both an exposure chamber for said film material and another chamber for shielding said materials from actinic light after their subjection to compression, said frontal body serving to mount said means for exposing said film, said intermediate body being pivotally connected to said frontal body at one end of the latter and comprising a pair of oppositely-facing surfaces one of which serves to hold said film in contact with said exposure means and to form said exposure chamber and the other of which serves to support said materials after their compression and to form said other chamber, and said rear body serving to mount the other of said pressure-applying members and being pivotally connected to said frontal body at an opposite end of the latter, said pivotal bodies, when at open position, providing a separation of said pressure-applying members from one another and access within the apparatus for loading and threading said film and other material and, at closed position, providing formation of said chambers and placement of said pressure-applying members in adjacent relation to one another for treating said materials.

14. Apparatus for exposing and processing a photosensitive film material comprising, in combination, means for mounting a roll of said film material, means for mounting a roll of another sheet material of a type suitable for having a plurality of positive prints of the subject images to which said film material is exposed formed thereon and comprising removable portions adapted to bear said prints so that the latter may be manually separated from other portions, means positioned between said mounting means for the film and other material providing an exposure position for said film material, means for exposing said film material when in said exposure position, means comprising a pair of pressure-applying members between which said materials are to be advanced in superposed relation for compressing said materials during their advancement and for cooperating therewith to provide a flow of a film-processing fluid between said materials, means comprising a plurality of pivotable bodies for supporting the aforesaid means, a frontal body and a rear body thereof providing separate casing portions of said apparatus and a third body, intermediate of said frontal and rear bodies, comprising portions forming therewith both an exposure chamber for said film material and another chamber for shielding said materials from actinic light after their subjection to compression, said frontal body serving to mount said means for exposing said film, said intermediate body serving to mount one of said pressure-applying members and being pivotally connected to said frontal body at one end of the latter and said rear body serving to mount the other of said pressure-applying members and being pivotally connected to said frontal body at an opposite end of the latter, latch means for releasably locking said rear body to said frontal body when the former is pivoted to closed position, and door means mounted upon said rear body providing access to said materials for removal of said removable portions thereof carrying said positive print, the aforesaid pivotal bodies, when at open position, providing a separation of said pressure-applying members from one another and access within the apparatus for loading and threading said film and other material and, at closed position, providing formation of said chambers and placement of said pressure-applying members in adjacent relation to one another for treating said materials.

15. Apparatus for exposing and processing a photosensitive film material comprising, in combination, means for mounting a roll of said film material, means for mounting a roll of another sheet material, means positioned between said mounting means for the film and other material providing an exposure position for said film material, means for exposing said film material when in said exposure position, means comprising a pair of pressure-applying members between which said materials are to be advanced in superposed relation for compressing said materials during their advancement and for cooperating therewith to provide a flow of a film-processing fluid between said materials, and means comprising a plurality of pivotable bodies for supporting the aforesaid means, a frontal body and rear body thereof providing separate casing portions of said apparatus and a third body, intermediate of said frontal and rear bodies, comprising portions forming therewith both an exposure chamber for said film material and another chamber for shielding said materials from actinic light after their subjection to compression, said frontal body serving to mount said means for exposing said film, said intermediate body which is pivotally connected to said frontal body at one end of the latter serving to mount one of said pressure-applying members and comprising a pair of oppositely-facing surfaces, a frontal surface of which serves to hold said film in contact with said exposure means and to form said exposure chamber and a rear surface of which serves to support said materials after their compression and to form said other chamber, and said rear body serving to mount the other of said pressure-applying members and being pivotally connected to said frontal body at an opposite end of the latter, said frontal body including a pair of light-shielding strips extending longitudinally along edge portions thereof and said intermediate body including a pair of light-shielding strips extending longitudinally along said rear surface thereof, each of said pairs of strips cooperating with the other at closed position of said pivotal bodies to prevent actinic light from passing from the rear to the front of said intermediate body, said pivotal bodies, when at open position, providing a separation of said pressure-applying members from one another and access within the apparatus for loading and threading said film and other material and, at closed position, providing formation of said chambers and placement of said pressure-applying members in adjacent relation to one another for treating said materials.

16. Apparatus for exposing and processing a photosensitive film material comprising, in combination, casing means for enclosing said apparatus, means mounted within said casing exposure means providing an exposure position for photographic exposure of said film material, means for releasably mounting a roll of film material adjacent one end of said exposure means, means for releasably mounting a roll of another sheet material suitable for placement in face-to-face relation with exposed areas of film and for compression therewith adjacent an opposite end of said exposure means, means comprising a pair of pressure-applying members mounted to one side of said last-named end of said exposure means for compressing successive areas of said exposed film and said other material when drawn therebetween in face-to-face relation to provide release and spreading of a film-processing fluid between the materials, means comprising a pair of oppositely-facing surfaces, a frontal surface of which is employed for locating said film against said exposure means and a rear surface of which is employed for providing a light-tight chamber for receiving and holding said materials after their compression, means associated with means for mounting one of said pressure-applying members for engaging longitudinal edge portions of at least one of said materials for guiding said material and preventing transverse displacement of said material relative to said other material during advancement of the materials between the pressure-applying members, and means forming a slot in said casing through which said materials may be drawn manually through said apparatus to a position exteriorly thereof.

17. In a camera, in combination, an outer housing, means forming an exposure chamber for the exposure of a light-sensitive film, means forming a second chamber for the processing of said film, a pivotally mounted internal common wall element for said chambers, said common wall element being mounted within said outer housing, means associated with said wall element for positioning film for exposure within said first-mentioned chamber, said chambers being so located that a light-sensitive film may travel from said exposure chamber into said second chamber, and film-processing means comprising a pair of pressure-applying members, said members being located in the path of travel of said film from said exposure chamber into said second chamber, said second chamber being of such size as to hold flat the area of film exposed in said exposure chamber.

18. In a camera, in combination, another housing, means forming an exposure chamber for the exposure of a light-sensitive film, means forming a second chamber for the processing of said film, a pivotally mounted internal common wall element for said chambers, said common wall element being mounted within said outer housing, means carried by said wall element for positioning film for exposure within said first-mentioned chamber, and means for pressing a processing medium into engagement with said film in its travel from said first to said second chamber, said last-named means comprising a pair of pressure-applying members, said members being located in the path of travel of said film from said exposure chamber into said second chamber, said second chamber being of such size as to hold flat the area of film exposed in said exposure chamber.

19. In a camera, in combination, an outer housing, means forming an exposure chamber for the exposure of a light-sensitive film, means forming a second chamber for the processing of said film, a pivotally mounted internal common wall element for said chambers, said common wall element being mounted within said outer housing, means carried by said wall element for positioning film for exposure within said first-mentioned chamber, and means for pressing a processing medium into engagement with said film in its travel from said first to said second chamber, said last-named means comprising a pair of pressure-applying members located in the path of travel of said film from said exposure chamber to said second chamber, said chambers being in back-to-back relationship whereby access to said first chamber is obtained through said second chamber by moving said wall element and said second chamber being of such size as to hold flat the area of film exposed in said exposure chamber, said pressure-applying members being adjacent one edge and to one side of said chambers.

JOSEPH F. CARBONE.
MURRY N. FAIRBANK.

REFERENCES CITED

The following references are of record in the file of this patent:

UNITED STATES PATENTS

| Number | Name | Date |
|---|---|---|
| 1,197,732 | Gall | Sept. 12, 1916 |
| 1,424,816 | Grillone | Aug. 8, 1922 |

Certificate of Correction

Patent No. 2,455,111 — November 30, 1948

JOSEPH F. CARBONE ET AL.

It is hereby certified that errors appear in the printed specification of the above numbered patent requiring correction as follows:

Column 3, line 21, for the word "of", first occurrence, read *on*; column 7, line 51, for "interferences" read *interference*; column 14, line 7, after the word "other" strike out "end"; line 67, after "of" insert *the*; column 15, line 4, for "ridged" read *rigid*; column 20, line 7, for "another" read *an outer*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*